(12) United States Patent
Tominaga (10) Patent No.: US 8,420,003 B2
(45) Date of Patent: Apr. 16, 2013

(54) METHOD OF MANUFACTURING A BELT MEMBER AND THE BELT MEMBER

(75) Inventor: Hiroshi Tominaga, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 496 days.

(21) Appl. No.: 12/704,756

(22) Filed: Feb. 12, 2010

(65) Prior Publication Data

US 2010/0209647 A1    Aug. 19, 2010

(30) Foreign Application Priority Data

Feb. 19, 2009  (JP) ................................ 2009-036686

(51) Int. Cl.
| | |
|---|---|
| *B28B 11/18* | (2006.01) |
| *B29C 39/02* | (2006.01) |
| *F16G 1/00* | (2006.01) |
| *G03G 15/01* | (2006.01) |
| *B29D 22/00* | (2006.01) |

(52) U.S. Cl.
USPC ........... 264/531; 264/138; 264/162; 264/500; 264/523; 264/532; 264/534; 264/540; 156/137; 399/303; 428/34.1; 428/35.7; 428/36.92

(58) Field of Classification Search .................. 264/138, 264/162, 500, 523, 531, 532, 534, 540; 156/137; 399/303; 428/34.1, 35.7, 36.92
See application file for complete search history.

(56) References Cited

U.S. PATENT DOCUMENTS

| | | | | |
|---|---|---|---|---|
| 6,916,393 | B2 * | 7/2005 | Ohzuru et al. | ................. 156/137 |
| 2006/0151907 | A1 * | 7/2006 | Kashiwabara et al. | ........ 264/138 |

FOREIGN PATENT DOCUMENTS

| | | | |
|---|---|---|---|
| JP | 11300849 A | | 11/1999 |
| JP | 2003301764 A | | 10/2002 |
| JP | 2006215076 A | | 8/2006 |
| JP | 2007168333 A | * | 7/2007 |

* cited by examiner

*Primary Examiner* — Christina Johnson
*Assistant Examiner* — Atul P Khare
(74) *Attorney, Agent, or Firm* — Fitzpatrick, Cella, Harper & Scinto

(57) ABSTRACT

A tube material is formed by continuously extruding a thermoplastic resin material in the shape of a cylinder that has a thickness of 100 μm and a circumferential length of 800 mm. After that, in a polishing process, the tube material is rubbed with a lapping tape of #2000 while being rotated in one direction at a fixed speed, so that circumferential stripes are formed on the outer circumferential surface of the tube material. Then, the circumferential stripes are thermally transferred by pressing the outer circumferential surface of the heated tube material against a mold surface that is finished in the shape of circumferential stripes by a thermal transfer process.

5 Claims, 8 Drawing Sheets

POLISHING PROCESS

FIG. 6B

THERMAL TRANSFER PROCESS

FIG. 7A

UNPOLISHED
TUBE MATERIAL

FIG. 7B

SURFACE TO WHICH
MOLD SURFACE
WAS TRANSFERRED

FIG. 7C

SURFACE TO WHICH
MOLD SURFACE
WAS NOT TRANSFERRED

FIG. 7D

POLISHED
TUBE MATERIAL

FIG. 8

METHOD OF MANUFACTURING A BELT MEMBER AND THE BELT MEMBER

BACKGROUND OF THE INVENTION

1. Field of the Invention

The present invention relates to a method of manufacturing an endless belt member using a thermoplastic resin material, and more particularly, to a method of improving cleaning performance of a belt member by a cleaning blade.

2. Description of the Related Art

An image forming apparatus, which transfers toner images to an intermediate transfer belt and conveys the toner images, has been widely used. An image forming apparatus, which transfers toner images to a recording material by using a recording material conveying belt, has also been widely used.

These belt members are formed to have a small thickness and a large width (to have a large length in a direction along a support rotating member), are rotated at high speed while being stretched and supported by plural rotary support bodies, and need to maintain a flat conveying surface over a long time.

For this reason, the belt member in the related art has been manufactured using a thermosetting resin (for example, polyimide), which has high mechanical strength and high thermal stability, by a centrifugal molding method.

However, a method of extruding a thermoplastic resin in a cylindrical shape is preferable in terms of manufacturing cost and recyclability. Various thermoplastic resin materials having required mechanical properties and various manufacturing methods based on extruding have been proposed in recent years.

Polyetheretherketone, polyamide-imide, polycarbonate, and the like have been proposed as thermoplastic resin materials in Japanese Patent Application Laid-Open No. 2002-301764. Further, tube materials are formed by extruding a thermoplastic resin material in a cylindrical shape and cutting the extruded thermoplastic resin material to a predetermined width, and a mold surface is thermally transferred to the surface of the tube material by pressing the tube materials against the cylindrical inner circumferential surface of a heated mold one by one. Stripes, which are formed in a direction of an extruding shaft by extruding, are formed on the surface of the tube material that is extruded as it is. Since the stripes of the belt member in the width direction, which are caused by the stripes of the tube material, cause transfer unevenness of a toner image, the stripes in the axial direction are removed by thermally transferring a mirror-finished smooth mold surface.

In the case of a belt member from which a transfer residual toner or toner image for control (color patch) is removed by being rubbed with a cleaning blade, stripes in a direction of an extruding shaft are not preferable since they cause vibration of the cleaning blade. However, it has been found that the cleaning performance of the cleaning blade is stable when appropriate undulations are formed on a flat and smooth mirror surface so that stripes are formed in a rotational direction. According to experimental examples to be described below, it has been found that it is preferable that a polishing pattern in a circumferential direction be formed on the belt member so that the ten-point average roughness of the surface roughness in the width direction is in the range of about 0.3 to 1 µm.

Accordingly, there has been provided a method of forming stripes on the cylindrical inner circumferential surface of the mold disclosed in Japanese Patent Application Laid-Open No. 2002-301764 and thermally transferring the heated mold surface, on which the stripes have been formed, to the surface of a tube material made of a thermoplastic resin.

However, if the mold surface on which circumferential stripes are formed is thermally transferred, a finish has been performed so that regions to which the circumferential stripes are partially insufficiently transferred are scattered due to protrusions formed on the surface of the tube material or air parcels formed on the surface of the tube material. Further, if the regions to which the circumferential stripes are partially insufficiently transferred are scattered on the surface of the belt member, the stability of the cleaning performance to be expected is not obtained as a result.

In contrast, if a tube material manufactured by extruding is polished in a circumferential direction with a lapping tape, circumferential stripes are mechanically formed. As a result, it may be possible to reduce the unevenness of stripes on the surface (see FIG. 4). However, in this configuration, both end portions of the stripes swell or burrs are formed at the stripes due to polishing. As a result, it may not be possible to sufficiently stabilize cleaning performance.

For this reason, even though polishing for making the surface smooth is performed after a polishing process for forming stripes, it may not be possible to sufficiently remove burrs and the like.

SUMMARY OF THE INVENTION

The invention provides a belt member that reduces the influence of burrs and the like on the surface of the belt member, which is made of a thermoplastic resin, despite polishing the surface of the belt member.

The invention also provides a method of manufacturing a belt member, the method including: a first process of forming a tubular belt member that is made of a thermoplastic resin; a second process of polishing the outer surface of the belt member that is formed by the first process; and a third process of heating the polished surface of the belt member while pressurizing the polished surface of the belt member, after the second process.

Further features of the present invention will become apparent from the following description of exemplary embodiments (with reference to the attached drawings).

DESCRIPTION OF THE EMBODIMENTS

Embodiments of the invention will be described in detail below with reference to drawings. Insofar as a tube material, which has been finished by polishing, is heated, the invention may also be embodied by another embodiment where all or part of a configuration of the embodiments of the invention is replaced with the alternative configuration thereof.

A manufactured belt member is not limited to a full-color belt, a monochrome belt, a tandem type belt, and a one-drum type belt, and may be used as an intermediate transfer belt which carries a toner image or a recording material conveying belt which supports and conveys a recording material in an image forming apparatus.

Only main parts related with the formation/transfer of a toner image will be described as usage examples of a belt member, but the belt member may be used for various purposes, such as printers, various printing machines, copying machines, a FAX, a complex machine, and the like in addition to cylindrical structures, equipments, and devices required therefor.

<Image Forming Apparatus>

Figure 1:
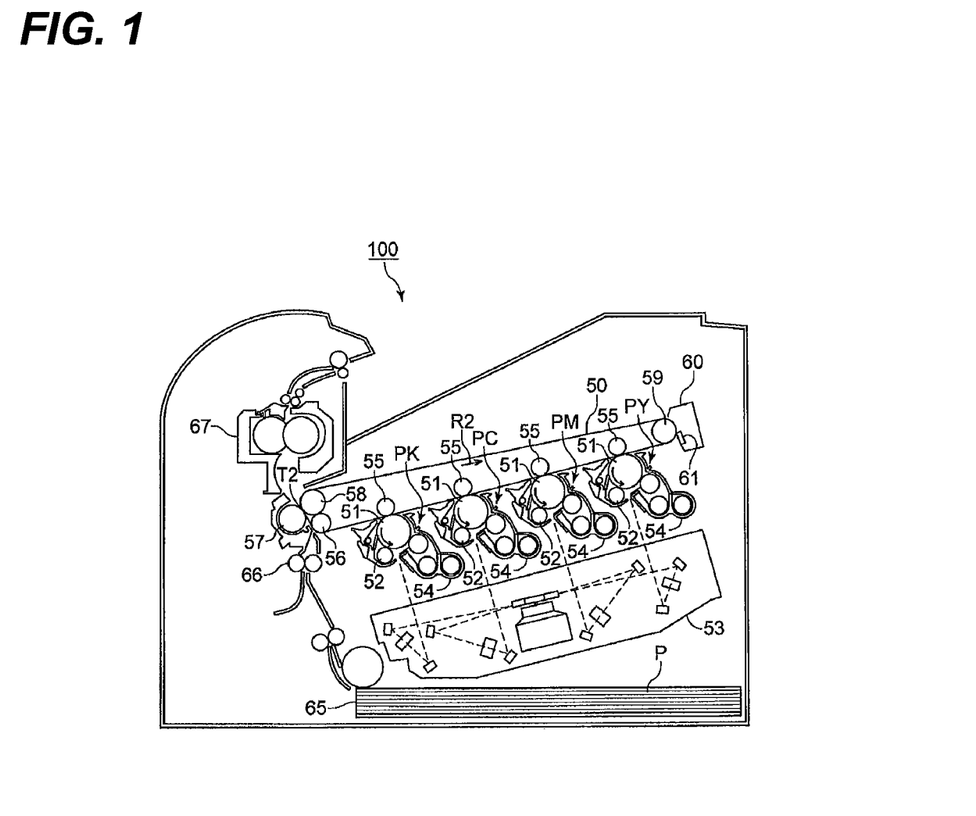
FIG. 1 is a view illustrating the configuration of an image forming apparatus using a belt member.

FIG. 1 is a view illustrating the configuration of an image forming apparatus using a belt member.

As illustrated in FIG. 1, an image forming apparatus 100 is a tandem type full-color printer where image forming portions PY, PM, PC, and PK corresponding to different developing colors are disposed along an intermediate transfer belt 50.

In the image forming portion PY, a yellow toner image is formed on a photosensitive drum 51 and is primarily transferred to the intermediate transfer belt 50. In the image forming portion PM, a magenta toner image is formed on a photosensitive drum 51 and is primarily transferred so as to be superimposed on the yellow toner image of the intermediate transfer belt 50. In the image forming portions PC and PK, a cyan toner image and a black toner image are formed on photosensitive drums 51 and 51, respectively, and are sequentially primarily transferred likewise so as to be superimposed on the toner images of the intermediate transfer belt 50.

Four color toner images carried on the intermediate transfer belt 50 are collectively secondarily transferred to a recording material P at a secondary transfer portion T2. The recording material P to which the toner images have been secondarily transferred at the secondary transfer portion T2 is heated and pressurized by a fixing device 67 so that the toner images are fixed to the surface of the recording material. Then, the recording material is discharged to the outside.

The image forming portions PY, PM, PC, and PK have substantially the same configuration except that colors of toner used in the developing device 54 are different from each other (yellow, magenta, cyan, and black). Each of the image forming portions PY, PM, PC, and PK is provided with a charging roller 52, a developing device 54, and a primary transfer roller 55 that are disposed around a photosensitive drum 51.

Each of the photosensitive drums 51 is formed of a metal cylinder on which a photosensitive layer having a negative charge polarity is formed, and is rotated at a predetermined processing speed in a direction of an arrow.

An oscillating voltage where an AC voltage is superimposed on a DC voltage is applied to each of the charging rollers 52, so that each of the charging rollers charges the surface of the photosensitive drum 51 to a uniform negative polarity potential.

An exposure device 53 writes electrostatic images of images on the surfaces of the charged photosensitive drums 51 by scanning the surfaces of the charged photosensitive drums with a laser beam, which is obtained by the ON-OFF modulation of scanning line image data obtained by the development of image data, by polyhedral mirrors.

The developing devices 54 make the toner, which is charged to a negative polarity, be carried on developing sleeves, rub the photosensitive drums 51, and apply an oscillating voltage where an AC voltage is superimposed on a negative DC voltage to the developing sleeves, thereby reversely developing the electrostatic images written on the photosensitive drums 51. The toner is a polyester resin, and has a volume average particle diameter of 6.2 μm.

Each of the primary transfer rollers 55 forms a primary transfer portion for a toner image between the photosensitive drum 51 and the intermediate transfer belt 50 by coming into press contact with the intermediate transfer belt 50 that is supported by the photosensitive drums 51. When a positive DC voltage is applied to each of the primary transfer rollers 55, the toner image, which is carried on each of the photosensitive drums 51 and has a negative polarity, is primarily transferred to the intermediate transfer belt 50.

The intermediate transfer belt 50, which is an endless belt-shaped intermediate transfer member, is disposed above the photosensitive drums 51 so as to horizontally pass through the image forming portions PY, PM, PC, and PK.

The intermediate transfer belt 50 is stretched and supported by a counter roller 58 that also functions as a driving roller, a tension roller 59, and a stretching roller 56, and is rotated at a high processing speed of 120 mm/sec in a direction of an arrow R2.

A secondary transfer roller 57 forms a secondary transfer portion T2 for a toner image between the intermediate transfer belt 50 and the secondary transfer roller 57 by coming into press contact with the intermediate transfer belt 50 that is supported by the counter roller 58.

Each of the recording materials P, which are drawn from a cassette 65 one by one, waits at a registration roller 66, and is fed to the secondary transfer portion T2 so as to correspond to the timing of the toner images transferred to the intermediate transfer belt 50.

At the secondary transfer portion T2, the recording material P is nipped and conveyed after the toner images transferred to the intermediate transfer belt 50 are superimposed on the recording material. Then, a positive DC voltage is applied to the secondary transfer roller 57, so that the toner images are secondarily transferred to the recording material P from the intermediate transfer belt 50.

A belt cleaning device 60 removes transfer residual toner remaining on the intermediate transfer belt 50, which has passed through the secondary transfer portion T2, by rubbing a cleaning blade 61 on the intermediate transfer belt 50. The cleaning blade 61 is made of urethane rubber having a JIS ASKER hardness scale of 70, and has a thickness of 2 mm. The cleaning blade 61 is abutted against the intermediate transfer belt 50 with a total pressing force of 10 N by pressing springs that are disposed at both ends of the cleaning blade.

<Method of Manufacturing Intermediate Transfer Belt>

Figure 2:
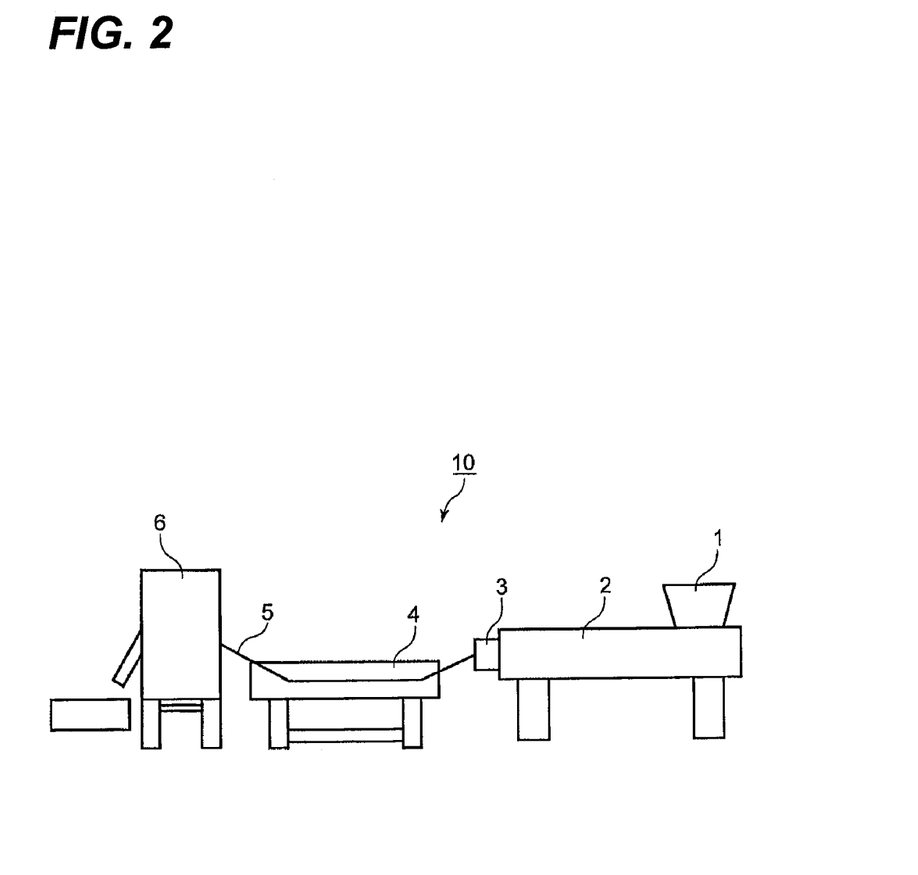
FIG. 2 is a view illustrating an apparatus for manufacturing material pellets.
Figure 3:
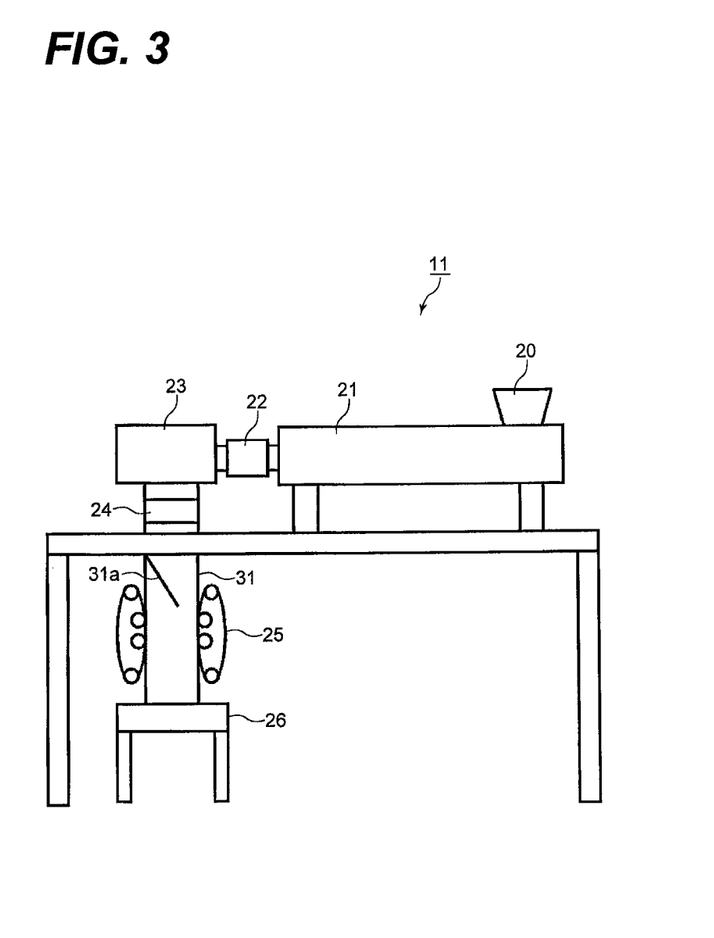
FIG. 3 is a view illustrating an extrusion molding device for a tube material.
Figure 4:
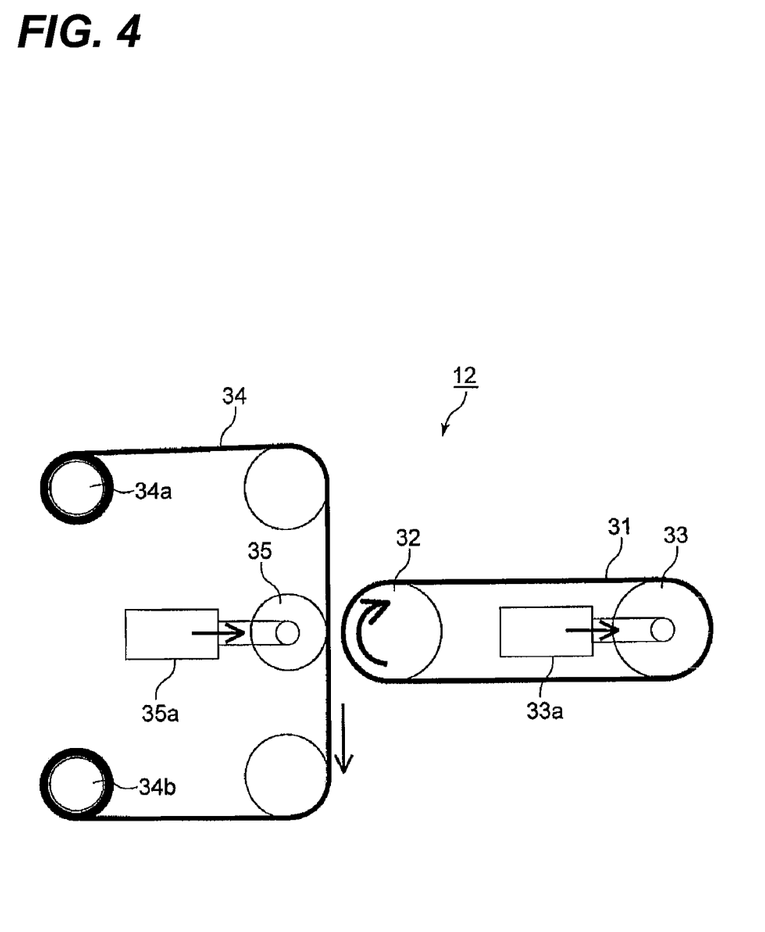
FIG. 4 is a view illustrating a polishing device for the tube material.
Figure 5:
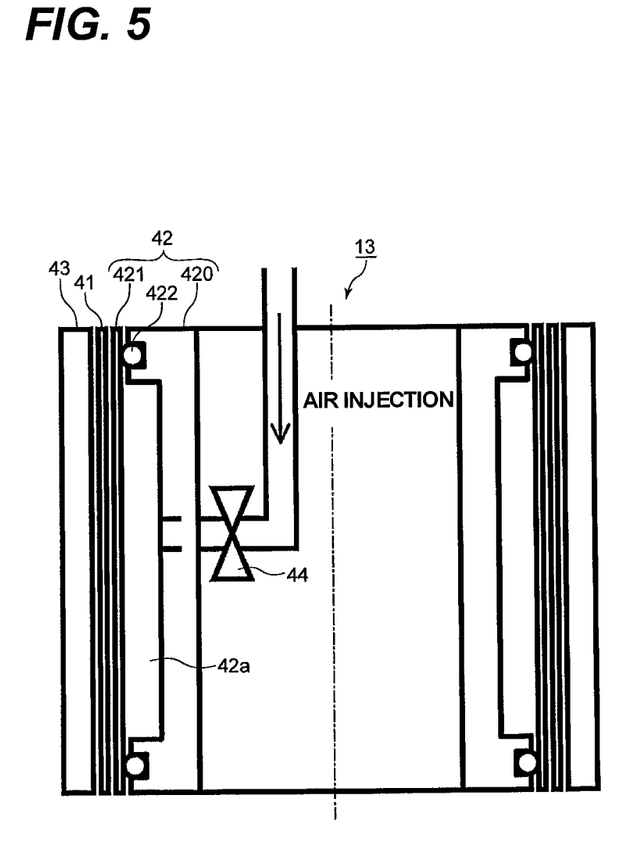
FIG. 5 is a view illustrating a device which thermally transfers circumferential stripes to the tube material.

FIG. 2 is a view illustrating an apparatus for manufacturing material pellets, FIG. 3 is a view illustrating an extrusion molding device for a tube material, FIG. 4 is a view illustrating a polishing device for the tube material, and FIG. 5 is a view illustrating a device which thermally transfers circumferential stripes to the tube material.

An extrusion heat melt molding method, which is typified by a cylinder molding method or an inflation method, has been known as a method of manufacturing a belt member using a thermoplastic resin. Since a belt member may be continuously manufactured in the extrusion heat melt molding method, it may be possible to obtain an advantage of manufacturing a belt member at a low cost in comparison with other methods. However, stripe-like extrusion unevenness, which deteriorates circumference accuracy and is generally called a die line in an extrusion direction, is apt to be generated in order to obtain an accurate image. Further, since the smoothness of the surface of a tube material, which is formed by extrusion heat melt molding, is not enough for a belt member, there is a high possibility that stripe-like image unevenness and cleaning failure are generated.

As described above, in Japanese Patent Application Laid-Open No. 2002-301764, a thermal transfer process of a mold surface is introduced in order to solve the problem of a tube material that is manufactured by the extrusion heat melt molding method. While being fitted to an inner mold, a tube material is fitted to an annular outer mold having the coefficient of thermal expansion lower than that of the inner mold. Then, all the molds are heated and the inner circumferential surface of the annular outer mold is thermally transferred, so that the circumference accuracy or a surface property is improved.

However, circumference accuracy may be improved in the method disclosed in Japanese Patent Application Laid-Open No. 2002-301764. However, a portion to which the mold surface is insufficiently transferred may be generated due to the influence of air caught when the tube material is fitted to the annular outer mold. Voids are formed between the tube material and the inner circumferential surface of the outer mold even around a point-like protrusion, which is generated at the tube material by chance, so that the transfer of the mold surface becomes insufficient.

For this reason, an adverse effect on the image such as cleaning failure is apt to be made at the portion to which the mold surface is insufficiently transferred.

In this embodiment, there has been provided a polishing process for polishing the outer circumferential surface of the tube material, that is, an example of a cylindrical material in the shape of circumferential stripes after the tube material, that is, an example of a cylindrical material is formed using a thermoplastic resin material.

The outer circumferential surface of the tube material that is made of a thermoplastic resin and formed in an endless shape, is pressed against the heated mold surface that is finished in the shape of circumferential stripes by performing the thermal transfer process after the polishing process, so that the circumferential stripes are thermally transferred. The stripes have been formed on the mold surface in this embodiment. However, the mold surface may not have stripes and may heat the outer surface of the belt member.

As long as a material can be extruded, any material may be used as a thermoplastic resin material that may be used for the belt member. For example, polyetheretherketone, polyphenylene sulfide, polyethylene, polypropylene, polyamide, polyethylene terephthalate, polybutylene terephthalate, polyvinylidene fluoride, and the like are suitably used.

In order to give conductivity to the belt member, fine powder of at least one of an organic substance and an inorganic substance is mixed with the thermoplastic resin material.

Spherical fine particles, such as carbon black powder, magnesium oxide powder, magnesium fluoride powder, silicon oxide powder, aluminum oxide powder, boron nitride powder, aluminum nitride powder, titanium oxide powder, and the like may be used as the fine powder of an inorganic substance. In order to maintain the surface smoothness of the final belt member, it is preferable that the fine powder to be mixed have a spherical shape and a particle diameter of 1.0 µm or less.

The type and the particle diameter of the fine powder to be added and the content of the fine powder to be added are not particularly limited as long as necessary conductivity can be given to the belt member. However, considering the bending resistance, the mechanical strength, and the thermal conductivity of a base layer, it is preferable that the amount of mixed fine powder is preferably about 5 to 40 mass %, particularly, 5 to 25 mass % based on total amount to the base resin.

As illustrated in FIG. 2, pellets of a thermoplastic resin raw material are supplied to a cylinder 2 of a double-screw kneading extruder 10 through an inlet 1 together with fine powder of a conductive agent. Further, while the temperature of the cylinder 2 is maintained over the melting point of the resin raw material below a temperature that does not cause thermal degradation, the thermoplastic resin raw material is kneaded and is melted and extruded from a nozzle 3.

The prepared resin material, which has been melted and extruded, is processed into pellets by a so-called strand cutting method. A strand 5 having an outer diameter of 2 mm is extruded through the circular nozzle 3, is cooled by water in a cooling water tank 4, and is then cut to a length of about 2 mm by a cutter 6, so that prepared granular pellets having a size of 2 mm are manufactured.

As illustrated in FIG. 3, the prepared pellets are processed into a tube material, which is an example of a tubular belt member, by being extruded in a cylindrical shape by a tube manufacturing apparatus 11.

The tube manufacturing apparatus 11 includes a hopper 20, a single-screw extruder 21, a gear pump 22, an annular mold 23, a cooling device 24, an extraction driving portion 25, and a cutting device 26.

The above-mentioned prepared pellets are input to the hopper 20, are heated, and are then melted and extruded by the single-screw extruder 21. While a fixed quantity of the prepared resin material, which has been melted and extruded, is discharged by the gear pump 22, the prepared resin material is melted and extruded in a spiral shape through the annular mold 23 and is formed in the shape of a continuous tube.

A band heater is wound around the annular mold 23 so that the temperature is adjusted. Spiral dice, which perform extrusion in a spiral shape, are used as the annular mold 23 in consideration of generation of a weld line.

While maintaining a cylindrical shape, an extruded cylindrical tube material 31 is extruded and guided to the cooling device 24 by the extraction driving portion 25 of which the speed is adjusted so that extrusion is performed with a predetermined thickness. In this case, a die line 31a, which is a stripe in a drawing direction, may be formed on the tube material 31.

The tube material 31, which has been cooled and solidified by the cooling device 24, is cut to a predetermined length by the cutting device 26, thereby being processed into the tube material 31 used as a material of a tubular belt member. In this way, the tube material 31 is formed (first process).

As illustrated in FIG. 4, the outer circumferential surface of the tube material 31 is polished by a polishing device 12 thereafter (second process).

The tube material 31 is stretched around a counter roller 32 and a tension roller 33 that is an example of a support rotating member using a metal pipe material made of stainless steel.

The tension roller 33 may apply a predetermined tension to the tube material 31 by an air cylinder 33a and releases the tension so that the tube material 31 can be attached or detached.

The counter roller 32 also functions as a driving roller that is connected to a drive mechanism (not illustrated), rotationally drives the tube material 31 so that the tube material is moved in one direction at a fixed speed, and supports the tube material 31 from the inside of the tube material so as to abut the outer circumferential surface of the tube material 31 against a lapping tape 34.

A back-up roller 35 uniformly presses the lapping tape 34 against the tube material 31, which is supported by the counter roller 32, by a pressing force that is generated by air cylinders 35a provided at both ends of a shaft of the back-up roller. While the tube material 31 is rotated, the lapping tape 34 is wound around a take-up roller 34b from a supply roller 34a in a direction opposite to the rotational direction of the tube material 31. In this way, the outer circumferential surface of the tube material 31 is polished by the lapping tape 34 and circumferential stripes are formed on the outer circumferential surface of the tube material 31.

As illustrated in FIG. 5, the mold surface is thermally transferred to the outer circumferential surface of the tube material 41 by a thermal transfer surface finishing device 13 thereafter (after the second process) (third process).

The tube material 41 of which the outer circumferential surface is polished is mounted on the outer circumferential surface of a cylindrical inner mold 42 and is inserted into the cylindrical outer mold so as to be interposed between the outer circumferential surface of the inner mold 42 and the inner circumferential surface of the outer mold 43.

The outer mold 43 is a tubular member that is made of stainless steel and has a thickness of 2 mm. Circumferential stripes, which are formed by polishing, are finished on the entire inner circumferential surface of the outer mold 43.

The ten-point average roughness Rz of the inner circumferential surface of the outer mold 43 is 0.5 μm in a width direction and 0.2 μm in a circumferential direction.

The inner mold 42 is assembled so that an inner mold core 420, where an air pocket 42a is formed on the outer circumferential surface of an aluminum tube, is covered with an inner mold tube 421 (which is an example of a metal sheet cylindrical member) that is made of stainless steel and has a thickness of 0.1 mm. O-rings 422 made of silicon rubber are provided at both ends of the inner mold core 420 to seal the air pocket 42a, thereby sealing gaps between the inner mold core and the inner mold tube 421 (which is an example of a metal sheet cylindrical member).

Compressed air having a pressure of 0.5 MPa is introduced into an air pocket 42a, which is formed between the inner mold core 420 and the inner mold tube 421, through a cock 44. Accordingly, the entire inner circumferential surface of the inner mold tube 421 comes into contact with the inner mold core 420 and is uniformly pressurized by a fluid, thereby being inflated outward. As a result, the entire outer circumferential surface of the tube material 41 is simultaneously pressed against and comes into close contact with the entire inner circumferential surface of the outer mold 43, thereby being pressurized.

In this state, the outer circumferential surface of the outer mold 43 is heated at a predetermined temperature for a predetermined time by a halogen lamp heater and is cooled to a room temperature after the completion of the heating. Accordingly, the stripes, which are formed on the outer circumferential surface of the tube material by the polishing of the previous process, are squashed against the inner circumferential surface of the outer mold 43, so that circumferential stripes formed on the entire inner circumferential surface of the outer mold 43 are thermally transferred instead.

Heating time is set so that splits on the surface of the tube material, which are caused by the polishing of the previous process, are eliminated at a surface portion of the tube material not coming into contact with the mold surface and the roughness of a rough edge is slightly reduced. If temperature is excessively high or heating time is excessively long, the stripes formed by the polishing of the previous process are damaged. Accordingly, it is not preferable that temperature be excessively high or heating time be excessively long. Heating time depends even on the thickness of the outer mold 43, but excellent results are obtained at a heating time of 5 seconds or more.

The cock 44 is opened after the cooling, to discharge compressed air existing in the air pocket 42a between the inner mold tube 421 and the inner mold core 420 so that the diameters of the inner mold tube 421 and the tube material 41 are reduced. Then, the inner mold tube and the inner mold core are taken out of the outer mold 43.

Example 1

85.0 wt % of polyetheretherketone (trade name: Victrex PEEK450P, manufactured by Victrex plc) was used as the thermoplastic resin material.

15.0 wt % of conductive carbon black (acetylene black, trade name: DENKA BLACK, manufactured by DENKI KAGAKU KOGYO KABUSHIKI KAISHA) was used as the fine powder of the inorganic substance.

The double-screw kneading extruder 10 illustrated in FIG. 2 maintained the temperature of the cylinder 2 in the range of 340 to 400° C.

The temperature of the single-screw extruder 21 illustrated in FIG. 3 was set in the range of 340 to 400° C., and the temperature of the annular mold 23 was adjusted to 395° C. The cutting device 26 cut a resin tube to a drawing length of 400 mm, so that a tube material having a circumferential length of 800 mm, a width of 400 mm, and a thickness of about 100 μm was obtained.

The polishing device 12 illustrated in FIG. 4 wound the lapping tape 34 around the take-up roller 34b from the supply roller 34a at a speed of 20 mm/min while rotating the tube material 31 at a rotation speed of 800 mm/sec.

A roll lapping tape of #2000 manufactured by Sumitomo 3M Ltd. was used as the lapping tape 34. The back-up roller 35 is a roller that has an outer diameter of 30 mm and a length of 350 mm and includes an elastic layer made of urethane rubber having a JIS ASKER hardness scale of 50 on the surface thereof. The back-up roller 35 pressed the lapping tape 34 by a pressing force with a total pressing force of 50 N.

Circumferential stripes were formed by rubbing the lapping tape 34 on the outer circumferential surface of the tube material 31 for 2 minutes.

Before and after the polishing was performed by the polishing device 12, the surface roughness of the outer circumferential surface of the tube material 31 was measured by a method defined in JIS'94 B0601. A surface roughness meter used for the measurement is SURFCORDER SE3500 manufactured by Kosaka Laboratory Ltd. The end r of a sensing pin of a detector is a diamond of 2 μm, the measuring force thereof is 0.75 mN, and the speed thereof is 1 mm/sec. An evaluation item is a ten-point average roughness Rz.

The ten-point average roughness Rz of the unpolished outer circumferential surface of the tube material was 1.0 μm in the width direction and 1.0 μm in the circumferential direction.

The ten-point average roughness Rz of the polished outer circumferential surface of the tube material was 0.5 μm in the width direction and 0.2 μl in the circumferential direction.

In the thermal transfer surface finishing device 13 illustrated in FIG. 5, the outer circumferential surface of the outer mold 43 was heated up to 350° C., was maintained in this state for 20 seconds, and was cooled to a room temperature after the completion of the heating.

The tube material 41, which had a length of 400 mm and was cooled after the completion of the thermal transfer, was cut to a width of 350 mm and meandering prevention ribs were mounted on both ends of the inner circumferential surface of the tube material by double-sided tape, so that the intermediate transfer belt 50 illustrated in FIG. 1 was completed.

The surface condition of the intermediate transfer belt 50 was observed, and the ten-point average roughness Rz of the outer circumferential surface of the intermediate transfer belt 50 was measured.

As for appearance, portions where the tube material 41 could not come into close contact with the outer mold 43 were scattered and observed on the outer circumferential surface of the intermediate transfer belt 50 to which the inner circumferential surface of the outer mold 43 was thermally transferred. Portions to which the inner circumferential surface of the outer mold 43 was not completely thermally transferred were slightly observed.

The intermediate transfer belt 50 manufactured in this way was mounted on the image forming apparatus as illustrated in FIG. 1, and the experiment for confirming the cleaning performance of the belt cleaning device 60 was then performed. As a result, like in the region to which the mold surface was thermally transferred, toner cleaning performance was excellent on both a surface transfer portion and a poor surface transfer portion. For this reason, all transfer residual toner was removed from the intermediate transfer belt 50 by the cleaning blade 61.

Intermediate transfer belts of Examples 2 and 3 and Comparative examples 1 to 4 were manufactured by slightly changing various conditions of the above-mentioned Example 1 as illustrated in Table 1, and the same experiment and evaluation as those of Example 1 were performed.

TABLE 1

| | | EXAMPLE 1 | EXAMPLE 2 | EXAMPLE 3 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|---|
| SURFACE OF BELT | ROUGHNESS Rz IN WIDTH DIRECTION Rz [μm] | 0.5 | 0.3 | 1.0 | 0.2 | 1.2 | 0.7 | 0.5 |
| | ROUGHNESS Rz IN CIRCUMFERENTIAL DIRECTION Rz [μm] | 0.2 | 0.2 | 0.3 | 0.2 | 0.3 | 0.7 | 0.2 |
| | LAPPING FILM | SUMITOMO 3M #2000 | SUMITOMO 3M #3000 | SANKYO RIKAGAKU #1500 | SUMITOMO 3M #6000 | SUMITOMO 3M #1200 | — | SUMITOMO 3M #2000 |
| ROUGHNESS Rz OF INNER SURFACE OF OUTER MOLD IN WIDTH DIRECTION Rz [μm] | | 0.5 | 0.3 | 1.0 | 0.2 | 1.2 | 0.5 | 0.5 |
| POLISHING POSITION | | BEFORE MOLDING | BEFORE MOLDING | BEFORE MOLDING | BEFORE MOLDING | BEFORE MOLDING | — | AFTER MOLDING |
| CLEANING PERFORMANCE | | ○ | ○ | ○ | X | X | X | X |

The portions where the tube material could not come into close contact with the outer mold are portions where air is caught when the tube material 41 comes into close contact with the outer mold 43, or portions around protrusions of 0.1 to 0.2 mm that are called seeds formed on the surface of the tube material 41. The protrusions called seeds are observed in a state of a continuous tube that is extruded by the single-screw extruder 21 illustrated in FIG. 3, and it is considered that the protrusions are caused by the local unevenness of the mixture of raw materials and the unevenness of the temperature of the annular mold 23. It is considered that the protrusions called seeds hinder the inner circumferential surface of the outer mold 43 from coming into close contact with the tube material 41.

However, the ten-point average roughness Rz of not only the region where the inner circumferential surface of the outer mold completely comes into close contact with the tube material and the mold surface was thermally transferred but also the portion to which the mold surface was not thermally transferred and the polished surface remained was 0.5 μm in the width direction orthogonal to the circumferential direction and 0.2 μm in the circumferential direction. Further, it was possible to obtain excellent traveling performance of the intermediate transfer belt with respect to the cleaning blade 61 of the image forming apparatus 100 illustrated in FIG. 1 by forming stripes, which make the ten-point average roughness Rz decrease in the circumferential direction, on the surface of the intermediate transfer belt 50.

As illustrated in Table 1, excellent cleaning performance of a cleaning blade was confirmed in Examples 2 and 3 but there was confirmed that Comparative examples 1 to 4 had various problems in the cleaning performance.

Example 2

In the case of an intermediate transfer belt of Example 2, the count of a lapping tape used in the polishing device 12 illustrated in FIG. 4 is #3000 that is finer than that of the lapping tape in Example 1. Further, according to this, the inner circumferential surface of the outer mold 43 of the thermal transfer surface finishing device 13 illustrated in FIG. 5 was finished so as to have a ten-point average roughness Rz of 0.3 μm in the width direction orthogonal to the circumferential direction. The tube material 41 was formed to be the same as that of Example 1 except for this, and the mold surface was thermally transferred to the tube material.

As illustrated in Table 1, the ten-point average roughness Rz of a portion of the intermediate transfer belt of Example 2 to which the mold surface was not thermally transferred and the polished surface remained was 0.5 μm in the width direction orthogonal to the circumferential direction and 0.2 μm in the circumferential direction.

Example 3

In the case of an intermediate transfer belt of Example 3, the count of a lapping tape used in the polishing device 12 illustrated in FIG. 4 is #1500 that is rougher than that of the lapping tape in Example 1. Further, according to this, the inner circumferential surface of the outer mold 43 of the thermal transfer surface finishing device 13 illustrated in FIG. 5 was finished so as to have a ten-point average roughness Rz of 1.0 μm in the width direction. The tube material 41 was formed to be the same as that of Example 1 except for this, and the mold surface was thermally transferred to the tube material.

As illustrated in Table 1, the ten-point average roughness Rz of a portion of the intermediate transfer belt of Example 3 to which the mold surface was not thermally transferred and the polished surface remained was 1.0 μm in the width direction orthogonal to the circumferential direction and 0.3 μm in the circumferential direction.

Comparative Examples 1 and 2

In the case of an intermediate transfer belt of Comparative example 1, the count of a lapping tape used in the polishing device 12 illustrated in FIG. 4 is #6000 that is finer than that of the lapping tape in Example 2. Further, according to this, the inner circumferential surface of the outer mold 43 of the thermal transfer surface finishing device 13 illustrated in FIG. 5 was finished so as to have a ten-point average roughness Rz of 0.2 μm in the width direction. The tube material 41 was formed to be the same as that of Example 1 except for this, and the mold surface was thermally transferred to the tube material.

As illustrated in Table 1, the ten-point average roughness Rz of a portion of the intermediate transfer belt of Comparative example 1 to which the mold surface was not thermally transferred and the polished surface remained was 0.2 pin in the width direction orthogonal to the circumferential direction and 0.2 μm in the circumferential direction.

In the case of an intermediate transfer belt of Comparative example 2, the count of a lapping tape used in the polishing device 12 illustrated in FIG. 4 is #1200 that is rougher than that of the lapping tape in Example 3. Further, according to this, the inner circumferential surface of the outer mold 43 of the thermal transfer surface finishing device 13 illustrated in FIG. 5 was finished so as to have a ten-point average roughness Rz of 1.2 μm in the width direction orthogonal to the circumferential direction. The tube material 41 was formed to be the same as that of Example 1 except for this, and the mold surface was thermally transferred to the tube material.

As illustrated in Table 1, the ten-point average roughness Rz of a portion of the intermediate transfer belt of Comparative example 2 to which the mold surface was not thermally transferred and the polished surface remained was 1.2 μm in the width direction orthogonal to the circumferential direction and 0.3 μm in the circumferential direction.

From the evaluation results of Examples 1 to 3 and Comparative examples 1 and 2, it is determined that excellent cleaning performance may be secured like in Example 1 if the ten-point average roughness Rz of the intermediate transfer belt is in the range of 0.3 to 1.0 μm in the width direction orthogonal to the circumferential direction.

If the ten-point average roughness Rz of the intermediate transfer belt in the width direction orthogonal to the circumferential direction is lower than 0.3 μm, the adherence between the cleaning blade 61 and the intermediate transfer belt is improved. For this reason, it is considered that the end of the cleaning blade 61 turns like the case of a mirror surface. If the ten-point average roughness Rz of the intermediate transfer belt in the circumferential direction is higher than 1.0 μm, voids are formed on the surfaces of the cleaning blade 61 and the intermediate transfer belt. For this reason, it is considered that toner particles are apt to be taken out.

Comparative Example 3

A polishing process using the polishing device 12 illustrated in FIG. 4 is omitted in the case of an intermediate transfer belt of Comparative example 3. The inner circumferential surface of the outer mold 43 of the thermal transfer surface finishing device 13 illustrated in FIG. 5 was finished so as to have a ten-point average roughness Rz of 0.5 μm in the width direction orthogonal to the circumferential direction like in Example 1. The tube material 41 was formed to be the same as that of Example 1 except for this, and the mold surface was thermally transferred to the tube material.

In the appearance of the intermediate transfer belt of Comparative example 3, regions to which the mold surface was not thermally transferred were scattered in a region to which the mold surface was thermally transferred.

As illustrated in Table 1, the ten-point average roughness Rz of a portion of the intermediate transfer belt of Comparative example 3 to which the mold surface was thermally transferred was 0.5 μm in the width direction orthogonal to the circumferential direction and 0.2 μm in the circumferential direction. Meanwhile, the ten-point average roughness Rz of a portion to which the mold surface was not thermally transferred was 0.7 μm in the width direction and 0.7 μm in the circumferential direction. There was confirmed that there was a difference in the surface condition like appearance as described above.

When the intermediate transfer belt of Comparative example 3 was mounted on the image forming apparatus 100 illustrated in FIG. 1 like Example 1 and the cleaning performance of the intermediate transfer belt was evaluated, cleaning failure was confirmed from portions to which the mold surface was not thermally transferred.

The reason for this is considered that the cleaning blade 61 could not follow the surface of the intermediate transfer belt during the rotation of the intermediate transfer belt due to the high ten-point average roughness Rz in the circumferential direction. It is considered that the cleaning blade 61 microscopically floats on the intermediate transfer belt and toner particles are caught between the cleaning blade and the intermediate transfer belt, which causes cleaning failure.

Comparative Example 4

FIG. 6 is a view illustrating an advantage of thermally transferring a mold surface after a process for polishing the tube material, and FIG. 7 is a microscopic photograph of the surface of the tube material.

In the case of an intermediate transfer belt of Comparative example 4, a polishing process using the polishing device 12 illustrated in FIG. 4 was performed after the thermal transfer of a mold surface using the thermal transfer surface finishing device 13 illustrated in FIG. 5. The inner circumferential surface of the outer mold 43 was finished so as to have a ten-point average roughness Rz of 0.5 μm in the width direction orthogonal to the circumferential direction like in Example 1. The tube material 41 was formed to be the same as that of Example 1 except for this, and the mold surface of the outer mold 43 was thermally transferred first to the tube material. After that, the tube material was polished like in Example 1 by the polishing device 12.

Circumferential stripes, which were polished by using the lapping tape of #2000 like in Example 1, were uniformly formed in the appearance of the intermediate transfer belt of Comparative example 4. Since the polishing process was introduced in the final process, the difference between a region to which the mold surface was thermally transferred and a region to which the mold surface was not thermally transferred was not clearly determined in the appearance of the intermediate transfer belt. The ten-point average roughness Rz of the intermediate transfer belt was 0.5 μm in the width direction orthogonal to the circumferential direction and 0.3 μm in the circumferential direction, which were the same numerical values as Example 1.

However, when the intermediate transfer belt of Comparative example 3 was mounted on the image forming apparatus 100 illustrated in FIG. 1 like Example 1 and the cleaning performance of the intermediate transfer belt was evaluated, cleaning failure was generated. It was recognized that the debris of a material of the intermediate transfer belt was attached to the end of the cleaning blade 61 and chips were observed at the end of the cleaning blade 61.

Further, when the surface of the intermediate transfer belt was observed with an electronic microscope, it was confirmed that slight burrs and splits caused by polishing were generated along the polished stripes formed on the surface of the intermediate transfer belt. Accordingly, the burrs and splits formed on the surface of the intermediate transfer belt come into contact with the cleaning blade 61 and the chips of the cleaning blade were generated. As a result, it was considered that cleaning failure was generated.

Meanwhile, when the surface of the intermediate transfer belt of Example 1 was observed likewise with an electronic microscope, burrs and splits did not exist.

Figure 6A:
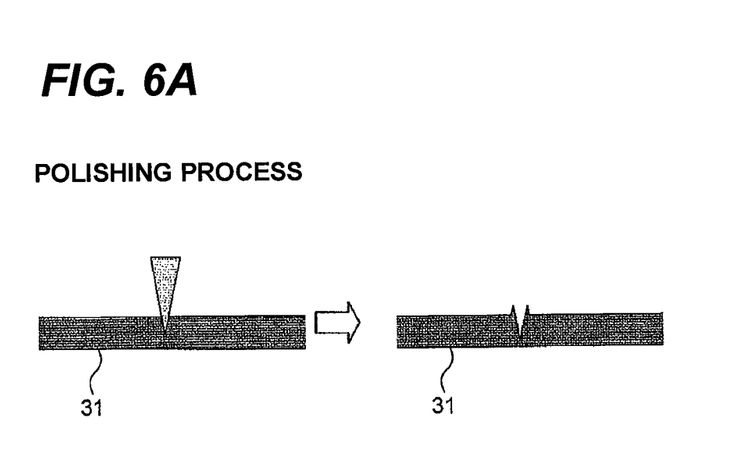
FIG. 6 is a view illustrating an advantage of thermally transferring a mold surface after a process for polishing the tube material.
Figure 6B:
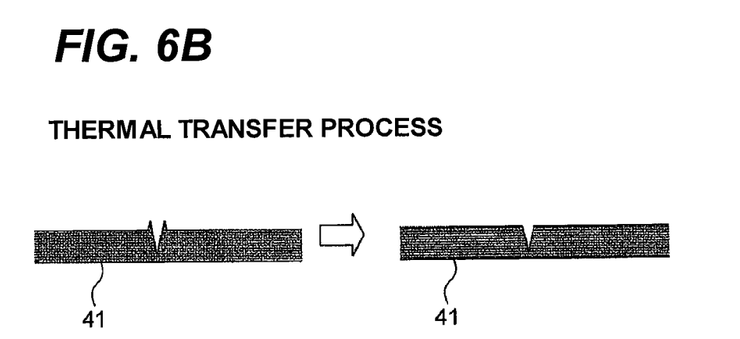

As illustrated in FIG. 6A, burrs and splits caused by a lapping tape are formed on the tube material 31 in the polishing process of Example 1. However, after that, since the tube material is heated by performing the thermal transfer process in the final process, the burrs and splits of a resin are melted as illustrated in FIG. 6B. Accordingly, it is considered that the influences of the burrs and splits on the cleaning blade 61 are reduced.

Figure 7A:
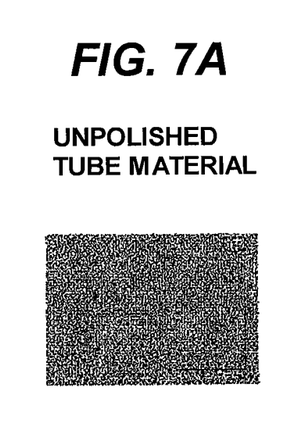
FIG. 7 is a microscopic photograph of the surface of the tube material.

As illustrated in FIG. 7A, on the surface of the unpolished tube material, there are no outstanding stripes and die lines are observed at intervals in the width direction that is the drawing direction.

Figure 7B:
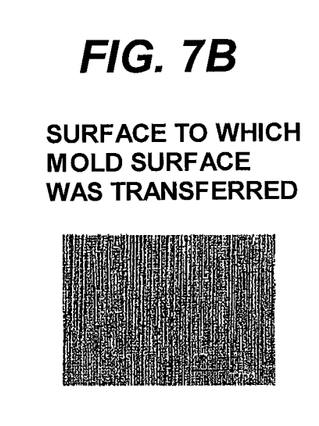

As illustrated in FIG. 7B, stripes, which do not have burrs and splits on the surface of the tube material, are formed on the surface to which the mold surface is thermally transferred in the thermal transfer process.

Figure 7C:
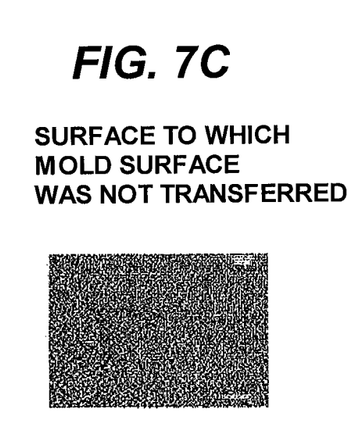

As illustrated in FIG. 7C, stripes illustrated in FIG. 7B are not formed on the surface of the tube material 31 (Comparative example 3), which is not subject to the polishing process, to which the mold surface is not thermally transferred in the thermal transfer process.

Figure 7D:
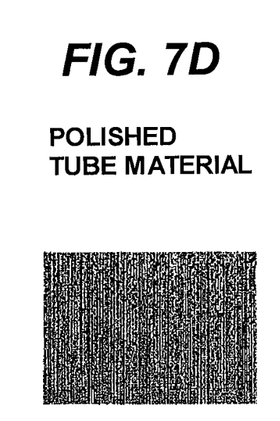

As illustrated in FIG. 7D, polished stripes on which burrs and splits stand out are formed on the surface of the tube material 31 that is subject to only the polishing process. However, if the thermal transfer process is performed, the burrs and splits of the polished stripes are removed by heating from a portion to which the mold surface is not transferred. As a result, it was observed that gentle stripes of edges were formed as substantially illustrated in FIG. 7B.

Example 4

Figure 8:
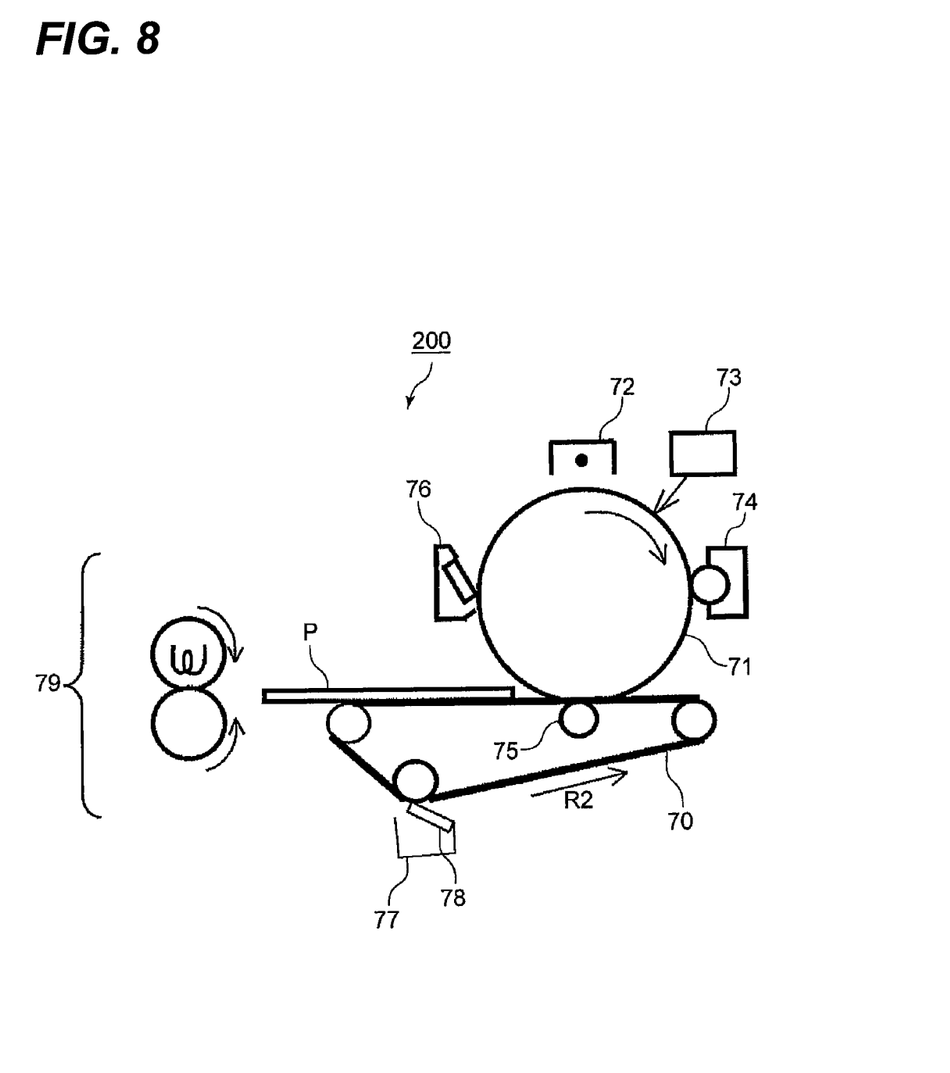
FIG. 8 is a view illustrating the configuration of an image forming apparatus using a recording material conveying belt.

FIG. 8 is a view illustrating the configuration of an image forming apparatus using a recording material conveying belt.

As illustrated in FIG. 8, an image forming apparatus 200 is a high-speed monochrome printer for transferring a toner image, which is formed on a photosensitive drum 71, to a recording material P that is supported by a recording material conveying belt 70.

The photosensitive drum 71 is formed of a metal cylinder on which a photosensitive layer having a negative charge polarity is formed, and is rotated at a predetermined processing speed in a direction of an arrow.

A corona charger 72 charges the surface of the photosensitive drum 71 to a uniform negative polarity potential by irradiating the photosensitive drum 71 with charged particles that are accompanied by corona discharge.

An exposure device 73 writes an electrostatic image of the image on the surface of the charged photosensitive drum 71 by scanning the surfaces of the charged photosensitive drums with a laser beam, which is obtained by the ON-OFF modulation of scanning line image data obtained by the development of image data, by polyhedral mirrors.

A developing device 74 makes the toner, which is charged to a negative polarity, be carried on a developing sleeve, rub the photosensitive drum 71, and apply an oscillating voltage where an AC voltage is superimposed on a negative DC voltage to the developing sleeve, thereby reversely developing the electrostatic image written on the photosensitive drum 71.

A transfer roller 75 makes the recording material conveying belt 70 come into contact with the photosensitive drum 71 by pressing the recording material conveying belt, thereby forming a transfer portion for a toner image with respect to a recording material P that is supported by the recording material conveying belt 70. When a positive DC voltage is applied to the transfer roller 75, the toner image, which is carried on the photosensitive drum 71 and has a negative polarity, is transferred to the recording material P that is carried on the recording material conveying belt 71.

The recording material P to which the toner image is transferred is conveyed to a fixing device 79 by the recording material conveying belt 70, and is heated and pressurized by the fixing device 79 so that the toner image is fixed to the surface of the recording material.

A belt cleaning device 77 removes a toner image for control (color patch) or toner attached to the recording material conveying belt 70 by rubbing a cleaning blade 78 on the recording material conveying belt 70. Paper powder that is attached to the recording material conveying belt 70 from the recording material P, and fog toner that is attached to the photosensitive drum 71 by the direct contact between the recording material conveying belt 70 and the photosensitive drum 71 are removed by rubbing. The cleaning blade 78 is made of polyurethane having a JIS ASKER hardness scale of 70 and has a thickness of 2 mm.

Each of the intermediate transfer belts of Examples 1 to 3 and Comparative examples 1 to 4 was mounted on the image forming apparatus 200 as the recording material conveying belt 70, and the cleaning performance of the cleaning blade 78 was evaluated.

TABLE 2

|  | EXAMPLE 1 | EXAMPLE 2 | EXAMPLE 3 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|
| CLEANING PERFORMANCE | ○ | ○ | ○ | X | X | X | X |

As illustrated in Table 2, in Examples 1 to 3, the ten-point average roughness Rz of the recording material conveying belt 70 was in the range of 0.3 to 1.0 μm in the width direction orthogonal to the circumferential direction and excellent cleaning performance of the cleaning blade 78 was confirmed. In Comparative examples 1 and 2, the ten-point average roughness Rz of the recording material conveying belt 70 was out of the range of 0.3 to 1.0 μm in the width direction orthogonal to the circumferential direction and the cleaning performance of the cleaning blade 78 deteriorated.

Further, in Comparative example 3 where the polishing process was omitted, cleaning failure was generated from a portion to which the mold surface was not thermally transferred. In Comparative example 4 where the polishing process was performed after the thermal transfer process, chips were generated at the end of the cleaning blade 78.

That is, it was possible to obtain the same evaluation results as those that were evaluated by the image forming apparatus 100 illustrated in FIG. 1.

The belt members of Examples 1 to 3 are more inexpensive than a belt member made of polyimide. Further, it may be possible to satisfy stable and high cleaning performance even at a portion to which the mold surface is incompletely thermally transferred.

As described above, according to the invention, it may be possible to reduce the influence of burrs and the like on the surface of the belt member, which is made of a thermoplastic resin, despite polishing the surface of the belt member.

Examples of the invention have been described above. However, the invention is not limited to any of these Examples, and may have various modifications within the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-036686, filed Feb. 19, 2009, which is hereby incorporated by reference herein in its entirety.

What is claimed is:

1. A method of manufacturing a belt member, the method comprising:
    a first process of forming an endless tubular belt member made of a thermoplastic resin;
    a second process of mechanically polishing an outer surface of the belt member formed by the first process to form circumferentially extending stripes on the outer surface of the belt member; and
    a third process of internally pressurizing the mechanically polished belt member, after the second process, so that an entire outer polished surface of the belt member is pressed against an entire inner circumferential surface of a heated cylindrical outer mold surface, wherein the mold also has stripes which extend along the entire inner circumferential surface thereof, and wherein the stripes formed by polishing on the outer surface of the belt member are pressed during the third process by the stripes formed on the inner surface of the mold.

2. The method of claim 1,
    wherein, in the third process, an inner mold tube contacts the entire inner circumferential surface of the tubular belt member to apply the internal pressure thereto by a fluid, so that the entire outer circumferential surface of the tubular belt member is simultaneously pressed during the third process against the entire inner circumferential surface of the cylindrical outer mold.

3. The method of claim 1,
    wherein the second process is a process of abutting the tubular belt member, which is stretched and rotated by a support rotating member, against a lapping tape that is moved in one direction at a fixed speed.

4. The method of claim 1,
    wherein, in the first process, the tubular belt member is formed by extruding a thermoplastic resin in a cylindrical shape and cutting the extruded thermoplastic resin to a predetermined length.

5. The method of claim 2,
    wherein the inner mold tube comprises a cylindrical metal sheet member.

* * * * *